J. Crutchett,
Burning Hydrocarbon

Nº 3,573.                    Patented May 6, 1844.

J. Crutchett,
Burning Hydrocarbon.
N° 3,573. Patented May 6, 1844.

UNITED STATES PATENT OFFICE.

JAMES CRUTCHETT, OF CINCINNATI, OHIO.

IMPROVEMENT IN GAS-LIGHT APPARATUS.

Specification forming part of Letters Patent No. 2,673, dated July 12, 1842.

*To all whom it may concern:*

Be it known that I, JAMES CRUTCHETT, a subject of the Queen of Great Britain, but now residing in the city of Cincinnati, in the State of Ohio, have made certain improvements in the apparatus used for manufacturing gas for the purpose of illumination and for mixing with the inflammable gases a measured quantity of atmospheric air, or of oxygen, or of atmospheric air and oxygen combined, in order to effect a more perfect combustion of those gases, and thereby of attaining greater economy in using them, and also, in combination with the foregoing, the introducing along with the mixed gases the vapor of naphtha, of spirits of turpentine, or of other evaporable hydrocarbons to aid in the combustion; and I do hereby declare that the following is a full and exact description thereof.

Figure 1:
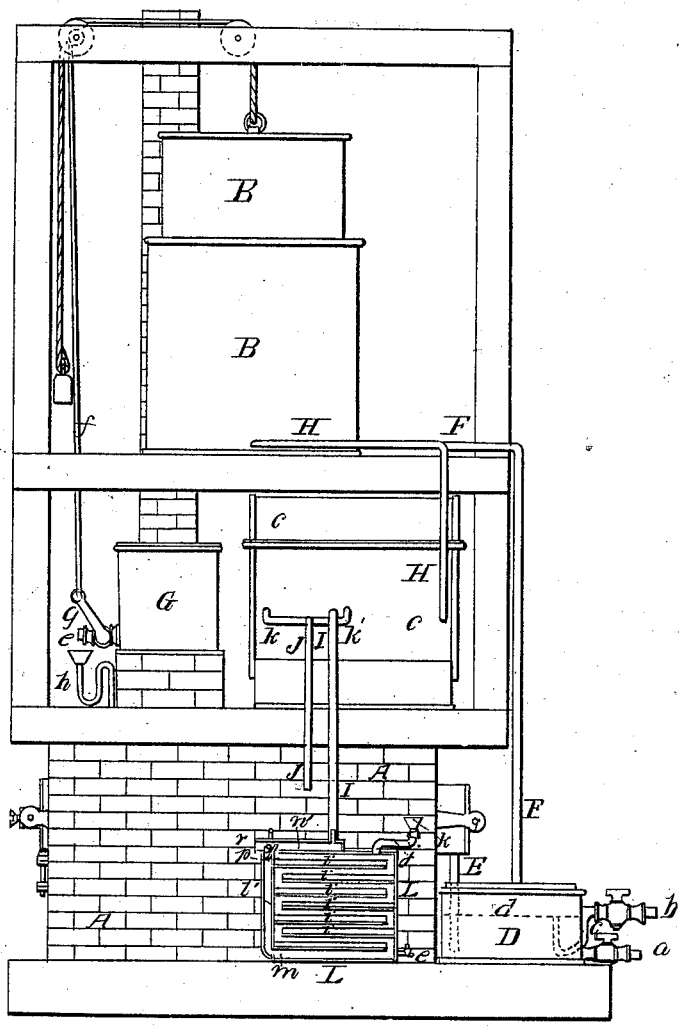

In the accompanying drawings, Figure 1 is an elevation of my machine for generating carbureted-hydrogen gas and for mixing the same with atmospheric air and for other purposes to be described.

A A is a stack containing a furnace and retort for the generating of carbureted hydrogen from coal, oil, or any fatty or resinous matter or other material from which gas is made. This part of the apparatus does not differ from such as is in use in gas-works, excepting in one particular, and that is in the manner of fitting the heads, which I do by turning and grinding, thus obviating the necessity of using luting of any kind. It is to be understood, however, that the retort for generating gas is not a necessary part of my apparatus, as where there are gas-works I obtain my supply therefrom.

B B is a gasometer of the ordinary construction.

C C is the outer case of a gas measuring and mixing apparatus, into which the carbureted hydrogen from the gasometer and a portion of atmospheric air, or of oxygen or other air, or combination of air and vapor, are to be conveyed, and by the peculiar construction of the measuring and mixing apparatus to be presently described are to be mixed together in determinate proportions.

D is the dipping or refrigerating box, which consists of one box inverted within another, which contains water, in the ordinary way.

E is the pipe through which the generated gas and the volatile oil which accompanies it passes into the dipping-box.

F F is the tube which conveys the gas from the dipping-box into the gasometer.

The cock $a$ in the lower part of the dipping-box is to draw off the water. The cock $b$ is to draw off the volatile oil without allowing of the escape of gas. This is a new and useful device in this part of the apparatus, and to effect this I use a tube $c$, which is bent in the form of the letter U and rises within the box to the water-line $d$, as shown by the dotted lines. This tube leading to the cock $b$ allows of the discharge of the volatile oil without that difficulty heretofore experienced in so doing.

G is a reservoir for containing oil or any other fluid or fused material that is to be converted into gas. This is so arranged as to supply the retort in such manner as shall correspond with the quantity to be consumed.

$e$ is a cock which will be opened by the descent of the gasometer, the line $f$ being connected to the lever $g$, by which the key of the cock is turned. As it is opened a portion of the contents of G will pass into the recurved tube $h$, leading into the retort, and as this is decomposed and the gasometer filled the supply through $e$ will be cut off.

H H is a tube leading from the gasometer into the gas-measuring apparatus to give the requisite supply of carbureted hydrogen.

I I is a tube for giving the requisite supply of atmospheric air to be mixed with the inflammable gas.

J J is the tube through which the mixed gases are to be conducted from the gas-mixer to the burners. This tube enters that marked K K', which has two branches, one of which supplies the proportionate quantity of atmospheric air which has been measured by the apparatus, and the other the inflammable gas that has also been measured thereby.

When oxygen gas or any other gas or a combination of air and vapor is to be used instead of atmospheric air alone, the tube I I is to be connected to a gasometer or other receiver containing the proper gas or compound instead of opening into the atmosphere. I sometimes change the atmospheric air to be introduced with the vapor of volatile oils or other hydrocarbons. The method of doing this is shown in Fig. 1, where L L represent a close metallic case or vessel, the front side of which has been removed for the purpose of showing its interior arrangement.

$i\ i$ is a series of shallow trays for containing the volatile liquid. These trays are fastened air-tight to the vessel L at their sides and at one of their ends, leaving an open passage at the other end. These open passages are left alternately at one end and at the other, so that air admitted at the bottom of the vessel and discharged at its top shall pass over each of the trays.

$j$ is a tube for filling the trays, which tube is furnished with a cock $k$, the liquid supplied falling from tray to tray till all are filled, as well as the bottom of the case below the opening through the cock $l$. Both of these cocks are to be set open while the trays are being filled. That this has been effected will be known by the escape of a portion of the fluid from the cock $l$. They are then both to be closed. A tube $l'$ opens into the lower part of the case or vessel L at $m$, and to the external air at $n$, and it passes over the case, as shown at $n'$, so as to connect with the tube I I, by which atmospheric air or other air or mixture of air and vapor is supplied to the gas-meter. A valve $o$ governs the passage of air through the tubes $l'$ and $n$ and through the vessel L L. When the valve $o$ stands horizontally, it closes the tube $l'$ and also an opening $p$, leading from the vessel L into the tube $n'$. When thus situated, atmospheric air alone would be admitted to the tube I I and pass through it into the gas-measurer. When the valve $o$ stands vertically, it shuts off the atmospheric air, so that it cannot pass from $n$ directly to $n'$, but is compelled to descend through the tube $l'$, so as to enter the case L below the lowermost tray, and it will then circulate between all the trays and pass through the opening $p$ into the tube $n'$, and thence into I I. In its passage it will become fully charged with the vapor of the naphtha or other volatile liquid contained in the trays.

The idea of mixing the vapor of naphtha or of other volatile liquid with illuminating-gas is not in itself new. The gas from coal, for example, has been made to pass through such liquids, and other modes of effecting this mixture of air and vapor have probably been essayed. Attempts also have been made to substitute the vapor of naphtha or other evaporable inflammable liquids for carburetted-hydrogen gas; but it has been found too difficult to effect this to allow of its coming into public use, and the thing has been abandoned. My improved process overcomes both these difficulties, which improvement, it will be seen, consists in the employment of a triple compound—namely, of carbureted hydrogen, atmospheric air, and the vapor of volatile hydrocarbons, the two latter being first combined and then made to commingle with the former in the manner above stated. The portion of atmospheric air which is mixed with the combustible gas, either with or without the addition of the combustible vapor, concurs with the air external to the flame in effecting a perfect combustion, and consequently in evolving a much greater amount of light than that ordinarily obtained from the consumption of the same portion of gas or vapor.

Figure 2:
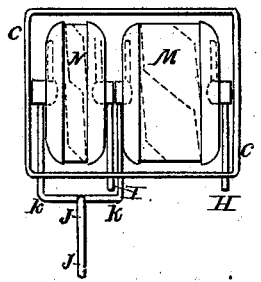
Figure 3:
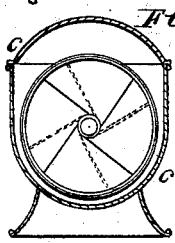

Fig. 2 is a view of the interior of the measuring and mixing apparatus, the top of its case being removed for the purpose of showing it. Fig. 3 is a transverse section of it through one of the drums contained within its case.

M and N are two drums, which, with the exception of their being closed at both ends, are constructed like the drums of the ordinary gas-meter, and, like them, revolve in water. These drums are both fixed on the same axle, in consequence of which if one of them be made to revolve the other will turn with the same velocity. One of these drums is to receive the carbureted hydrogen from a gasometer or other source and the other is to receive the atmospheric air either alone or saturated with inflammable vapor, or it may be made to receive oxygen or other gas instead of atmospheric air when desired. If these drums are made of equal capacity, they will supply equal quantities of the airs to the burners. If they are unequal, they will supply unequal quantities, and that in exact proportion to their respective capacities. The dotted lines on the surfaces of the drums show the line of the direction of the wings or buckets in the interior, which do not differ from those in common use in gas-meters.

The tubes which lead into the drums of the mixing apparatus and which convey the gases therefrom to the burners, which are shown in Fig. 2, are designated by the same letters as in Fig. 1. The drum M is represented as that which is to receive the gas from the gasometer, and the drum N is that which is to receive the atmospheric air, oxygen, or other gas.

As represented in the drawings, the capacity of the drum M is about double that of the drum N, and when so proportioned the airs when mingled together would consist of two parts of carbureted hydrogen and one part of atmospheric air, supposing these to be the two airs to be employed. The manner of altering these proportions will be manifest, as will also the manner of mixing a greater number of airs or gases in any determined proportions. The proportions of illuminating-gas and of atmospheric air, I have already said, will vary according to the nature of the former.

I have used with advantage as much as twenty-five per cent. of atmospheric air with coal-gas when of the best quality; but from five to fifteen per cent. is a more usually advantageous proportion. With oil-gas, according to its specific gravity, I have used proportions varying much from each other, amounting in some instances to upward of eighty per cent. This proportion is varied not only with the illuminating power of the gas, but also according to the intensity of the light or heat required. The introduction of the gas from the gasometer into its appropriate drum will by its pressure cause the shaft upon which it is placed to revolve, and the atmospheric or other drum being on the same shaft will be carried with it, by which it will be made to draw in or charge itself with its due proportion of air.

I have spoken of the drums within the measuring apparatus as being closed or capped at each end instead of at one end only, as in the ordinary gas-meter. This double cap is not necessary, however, excepting where the gases if mixed within the case would constitute explosive compounds; but as I intend to apply my mixing apparatus to the supplying of oxygen and hydrogen for producing the oxyhydrogen, Drummond, or other light I have named the double heads, as the gases must not in that or similar instances be allowed to mingle in the case C C, but at the junction of the tube J with K K', as represented, or by some device substantially the same.

Having thus fully described the nature of my improvements in the apparatus for preparing and using illuminating-gas, I will now proceed to set forth what I claim therein as new and as of my invention—

1. The combining of two or more drums on the same shaft, so that they shall revolve together in a suitable case or vessel containing water in the same way with the drum of the ordinary gas-meter, one or more of which drums are so arranged and combined as to draw in atmospheric air, oxygen, or air and vapor to be mixed in measured proportions with carbureted hydrogen, the proportionate quantity of each being governed by the capacity of the respective drums upon the principle or substantially in the manner herein set forth.

2. The combining with the atmospheric air previously to its mixture with the carbureted hydrogen, a portion of the vapor of naphtha, spirits of turpentine, or other suitable inflammable liquid whether this combination be effected by means of an apparatus constructed precisely as herein described or in any other way in which the same end is attained. I do not claim the combining of atmospheric air with the vapor of hydrocarbons when such combination is intended to be applied immediately to the purpose of illumination without a subsequent combination thereof with carbureted hydrogen, my claim in this particular having reference solely to the production of a triple compound of air, vapor, and gas with which to supply the burners, by which combination also I effect great economy in the production of artificial light. It is here to be clearly understood that I do not claim as of my invention the case L L, furnished with trays to contain naphtha or other volatile liquid, for, although I have introduced some improvements therein it is not new in its general arrangement.

3. The manner herein described of regulating the supply of oil or other fluid or fused matter from which gas is to be made, the rising of the gasometer being made to close and its descent to open a cock or valve by which such supply is governed.

4. Combining with the dipping-box the bent tube $c$, proceeding from the cock $a$, as set forth, for the purpose of drawing off the volatile oil without allowing of the escape of gas.

JAMES CRUTCHETT.

Witnesses:
THOS. P. JONES,
EDWIN L. BRUNDAGE.